Figures 1, 2:
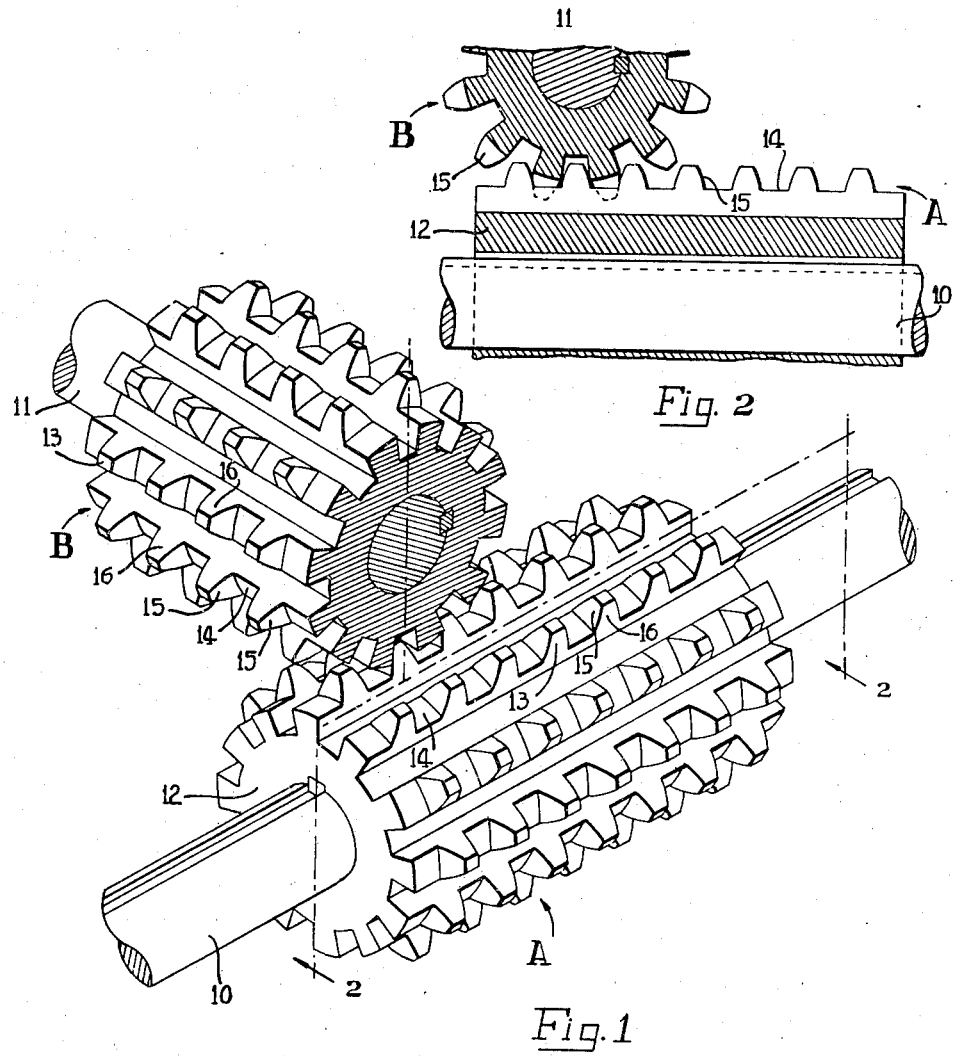

Nov. 9, 1948.                E. P. BULLARD, III                2,453,656
                        RACK AND PINION GEAR MEANS
                          Filed Sept. 15, 1945

INVENTOR,
EDWARD P. BULLARD III.
BY
ATTORNEY

Patented Nov. 9, 1948

2,453,656

UNITED STATES PATENT OFFICE 2,453,656

RACK AND PINION GEAR MEANS

Edward P. Bullard, III, Fairfield, Conn., assignor to The Bullard Company, a corporation of Connecticut Application September 15, 1945, Serial No. 616,568

4 Claims. (Cl. 74—422)

This invention relates to mechanical motions, and particularly to an arrangement of positive acting intermeshing means for transmitting oscillatory and reciprocatory motions between two angularly-related shafts.

Objects of the invention include the provision of a mechanical motion that will be positive in action and which will transmit oscillatory motion to a shaft at a plurality of points to which it can axially be moved by the same positive action means; the provision of a mechanical motion that will be positive in action and which will transmit reciprocable motion to a shaft at a plurality of different angular positions to which it can rotatively be moved by the same positive action means; the provisions of such a mechanical motion that will enable one to perform the above-mentioned functions remotely from the shaft to which said motions are transmitted; and the provision of a mechanical motion between two angularly-disposed shafts that will be positive in action and which is capable of transmitting a combined oscillating and reciprocating motion to either shaft by applying a combined reciprocating and oscillating motion to the other.

The above, as well as other objects and novel features of the invention, will become apparent from the following specification and accompanying drawing, in which:

Figure 1 is a perspective view showing the principles of the invention, parts being broken away to show others; and Figure 2 is a partial sectional elevational view taken substantially along a plane including line 2—2 of Figure 1.

Since the principles of the invention can be applied with equal facility to many structures, they will not be shown or described in connection with any particular apparatus. One particularly useful application of the principles of the invention, however, is to the shifting of clutches in the feed-works transmission of a machine tool at various remote points therefrom.

Referring to Figure 1, a toothed member A is keyed to a shaft 10 which can be reciprocated along and oscillated about its longitudinal axis. A similar toothed member B is keyed to a shaft 11 at substantially right angles to shaft 10, which shaft 11 can also be oscillated about and reciprocated along its longitudinal axis. Each of the members A and B comprises relatively long bodies 12 having elongated spur gear teeth 13 formed about their peripheries. Equally-spaced circumferential grooves 14 are cut in the teeth 13 to a depth of, or slightly below the pitch circle of the spur teeth 13. These grooves 14 are machined such that the walls 15 formed by them conform to the addendum surface 16 of the spur teeth 13. The grooves 14, therefore, provide axially-aligned teeth having dedendum height only, which alternate with teeth in the same axial row having both addendum and dedendum height. Additionally, these grooves form circumferential rows of teeth having dedendum height only, which rows alternate with circumferential rows of teeth having both addendum and dedendum height.

The toothed members A and B are intermeshed with their longitudinal axes at right angles to each other. The grooves 14 of the member A provide clearance to receive the teeth of member B which have dedendum height only, and the grooves 14 of the member B provide clearance for the reception of the teeth of member A which have dedendum height only.

Referring to Figure 2, oscillation of the member B causes reciprocation of the member A along its longitudinal axis through the action of the teeth of member B having dedendum height only meshing with the addendum portions 15 of member A that are formed by the grooves 14 thereof. Reciprocation of member B along its longitudinal axis causes oscillation of member A through the action of the addendum portions 15, formed by the grooves 14 of member B, meshing with the teeth of member A having dedendum height only.

Likewise, oscillation of the member A about its longitudinal axis causes reciprocation of the member B through the action of the teeth of member A having dedendum height only, meshing with the addendum surfaces 15 of member B formed by the grooves 14 thereof. And, reciprocation of the member A along its longitudinal axis causes oscillation of the member B through the action of the addendum surfaces 15, formed by grooves 14 of member A, meshing with the teeth of member B having dedendum height only.

From the foregoing, it is evident that either shafts 10 or 11 may be oscillated and reciprocated, imparting to the other reciprocation and oscillation respectively. Although the various features of the improved mechanical motion have been shown and described in detail to fully disclose one embodiment of the invention, it will be evident that numerous changes may be made in such details and certain features may be used without others without departing from the principles of the invention.

What is claimed is:

1. A mechanical motion device comprising in combination, a pair of shafts, each adapted to be moved between a plurality of axial positions and to be oscillated at any of said axial positions; and a pair of intermeshing spur gears of substantially identical design on said shafts, each including axially-spaced circumferential rows of teeth having full addendum and dedendum dimensions alternating with axially-spaced circumferential rows of teeth having dedendum dimensions only, the addendum of the teeth of both members intermeshing with the teeth of the other member having dedendum dimensions only.

2. A mechanical motion device comprising in combination, a pair of shafts, each adapted to be turned about its longitudinal axis to a plurality of angular positions and to be reciprocated at any of said angular positions; and a pair of intermeshing spur gears of substantially identical design on said shafts, each including axially-spaced circumferential rows of teeth having addendum and dedendum dimensions alternating with axially-spaced circumferential rows of teeth having dedendum dimensions only, the addendum of the teeth of both members intermeshing with the teeth of the other member having dedendum dimensions only.

3. A mechanical motion device comprising in combination, a pair of shafts, the longitudinal axes of which are angularly disposed relatively to each other; and a pair of intermeshing spur gears of substantially identical design on said shafts, each including axially-spaced circumferential rows of teeth having full addendum and dedendum dimensions alternating with axially-spaced circumferential rows of teeth having dedendum dimensions only, the addendum of the teeth of both members intermeshing with the teeth of the other member having dedendum dimensions only.

4. A combined rack and pinion including a curved surface; a plurality of spur gear teeth formed on said curved surface; and a plurality of grooves at right angles to said gear teeth in equally-spaced relation, the depth of said grooves extending to the pitch circle of said teeth and forming rack teeth having no dedendum, and pinion teeth having no addendum.

EDWARD P. BULLARD, III.

REFERENCES CITED

The following references are of record in the file of this patent:

UNITED STATES PATENTS

| Number | Name | Date |
|---|---|---|
| 1,124,112 | Craft | Jan. 5, 1915 |
| 1,178,017 | Kainer | Apr. 4, 1916 |